(12) United States Patent
Maeda et al.

(10) Patent No.: US 7,542,110 B2
(45) Date of Patent: Jun. 2, 2009

(54) LIQUID CRYSTAL DISPLAY DEVICE AND ELECTRONIC APPARATUS

(75) Inventors: Tsuyoshi Maeda, Kai (JP); Eiji Chino, Shiojiri (JP); Ikutaka Nachi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 395 days.

(21) Appl. No.: 11/067,943

(22) Filed: Mar. 1, 2005

(65) Prior Publication Data

US 2005/0237451 A1  Oct. 27, 2005

(30) Foreign Application Priority Data

Apr. 26, 2004   (JP)   ............... 2004-129656

(51) Int. Cl.
   *G02F 1/1335*   (2006.01)
(52) U.S. Cl. ..................................... 349/106
(58) Field of Classification Search ................ 349/106, 349/113, 61–71, 108; 316/149, 224, 291, 316/312; 345/589; 362/234, 253, 561, 632–634, 362/558, 800
See application file for complete search history.

(56) References Cited

U.S. PATENT DOCUMENTS

| | | | | | |
|---|---|---|---|---|---|
| 5,844,699 | A | * | 12/1998 | Usami et al. ............... | 358/518 |
| RE36,792 | E | * | 7/2000 | Sonehara .................... | 348/791 |
| 6,147,728 | A | | 11/2000 | Okumura et al. | |
| 6,348,977 | B1 | * | 2/2002 | Ooki .......................... | 358/1.9 |
| 6,373,538 | B2 | * | 4/2002 | Okumura et al. ............ | 349/106 |
| 6,570,584 | B1 | * | 5/2003 | Cok et al. ................... | 345/690 |
| 6,654,082 | B1 | * | 11/2003 | Sohda et al. ................ | 349/106 |
| 7,430,022 | B2 | * | 9/2008 | Hekstra et al. .............. | 348/743 |
| 2003/0011613 | A1 | * | 1/2003 | Booth, Jr. .................. | 345/589 |
| 2004/0264212 | A1 | * | 12/2004 | Chung et al. ................ | 362/561 |
| 2006/0046163 | A1 | * | 3/2006 | Broer et al. .................. | 430/7 |
| 2006/0158454 | A1 | * | 7/2006 | Heynderickx et al. ....... | 345/589 |

FOREIGN PATENT DOCUMENTS

| | | | |
|---|---|---|---|
| JP | A-62-125324 | | 6/1987 |
| JP | A-2001-209047 | | 8/2001 |
| JP | 2001306023 A | * | 11/2001 |
| JP | A-2001-306023 | | 11/2001 |
| WO | WO97/04350 | | 2/1997 |
| WO | WO97/45766 | | 12/1997 |
| WO | WO 02/101644 A2 | | 12/2002 |

* cited by examiner

*Primary Examiner*—Timothy Rude
(74) *Attorney, Agent, or Firm*—Oliff & Berridge, PLC

(57) ABSTRACT

To provide a liquid crystal display device having a high display quality and an excellent display characteristic and an electronic apparatus using the same. A liquid crystal display device includes color filter portions each having a plurality of colored layers in a unit pixel and a liquid crystal layer for controlling the amount of light passing through the color filter portions. The color filter portion has in the unit pixel first to third colored layers respectively having first and third peak wavelengths in a wavelength selection characteristic and a fourth colored layer having a peak wavelength between the first peak wavelength and the second peak wavelength, and a peak wavelength of a spectral characteristic of light passing through the liquid crystal layer corresponds to the fourth peak wavelength.

5 Claims, 5 Drawing Sheets

LIQUID CRYSTAL DISPLAY DEVICE AND ELECTRONIC APPARATUS

BACKGROUND

The present invention relates to a liquid crystal display device and an electronic apparatus.

Conventionally, liquid crystal display devices have a structure in which R (red), G (green), and B (blue) dots are provided in a unit pixel, and the amounts of light components emitted from the three-color dots are different from each other, thereby displaying an image with various colors.

However, since the natural world has wavelength bands of colors that cannot be displayed with only these three colors R, G, and B, it is difficult to realize colors close to natural light using only these three colors.

Therefore, in recent years, there has been proposed a liquid crystal display device capable of realizing colors close to natural light (for example, see Patent Document 1). The liquid crystal display device disclosed in Patent Document 1 has a pixel structure constructed by adding a C (cyan) dot to these R, G, and B dots. Since cyan is a color positioned outside a triangular region formed by linking R, G, and B points on a chromaticity graph, it is possible to realize a display color having a wider wavelength band. In Patent Document 1, a Y (yellow) dot and/or an M (magenta) dot are used in addition to the C dot.

[Patent Document 1] Japanese Unexamined Patent Application Publication No. 2001-306023.

SUMMARY

However, the present inventors confirmed that the technique described in Patent Document 1 could realize a display color having a wide wavelength band, but colors emitted from the C, Y, and M dots were dark, which makes it impossible to realize clearly colored light. That is, in the conventional technique, descriptive power can be improved, but display quality is not remarkably improved.

Accordingly, the present invention is designed to solve the above-mentioned problems, and it is an object of the present invention to provide a liquid crystal display device capable of improving display quality and display characteristics and an electronic apparatus using the same.

The inventors of the present invention found that, in the liquid crystal display device in which four-color dots are provided in a unit pixel, the display color of the C or Y dot other than the R, G, and B dots was dark and thus clearly colored light was not obtained.

Therefore, the present inventors designed the present invention having the following means, based on the above-mentioned problem.

That is, a liquid crystal display device of the present invention comprises: color filter portions each having a plurality of colored layers in a unit pixel; and a liquid crystal layer for controlling the amount of light passing through the color filter portions, wherein the color filter portion has in the unit pixel first to third colored layers respectively having first to third peak wavelengths and a fourth colored layer having a fourth peak wavelength between the first peak wavelength and the second peak wavelength in a wavelength selection characteristic, and a peak wavelength of a spectral characteristic of light passing through the liquid crystal layer corresponds to the fourth peak wavelength.

In the present invention, the colored layer is a layer for, when light is incident onto its one surface, transmitting a light component having a predetermined wavelength band included in the incident light from the other surface. Further, the first and fourth colored layers respectively transmit light components having the first and fourth peak wavelengths included in the incident light.

In the above-mentioned Patent Document, the display color of the fourth colored layer is dark, and thus clearly colored light is not obtained. The reason is that, because the peak wavelength of a transmission light spectral characteristic of the liquid crystal layer does not correspond to the fourth peak wavelength of a wavelength selection characteristic of the fourth colored layer, transmission light having a wavelength corresponding to the fourth peak wavelength is attenuated when passing through the liquid crystal layer, which results in a poor color development of the fourth colored layer.

On the contrary, according to the present invention, since the peak wavelength of the transmission light spectral characteristic of the liquid crystal layer corresponds to the fourth peak wavelength of the wavelength selection characteristic of the fourth colored layer, transmission light having a wavelength corresponding to the fourth peak wavelength illuminates the fourth colored layer without being attenuated in the liquid crystal layer. Thus, it is possible to improve the color development of the fourth colored layer and thus to emit clearly colored light therefrom.

Further, the color filter portion has the first to third colored layers and the fourth colored layer. Therefore, it is possible to realize a very wide color reproduction range and to display an image with a display color that is within a wider wavelength band and closer to natural light. In addition, since clearly colored light is emitted from the fourth colored layer, it is possible to display a high-quality image.

Furthermore, the liquid crystal layer performs a bright display operation for transmitting light with high transmittance, a dark display operation for transmitting light with low transmittance, and a half-tone display operation for stepwise controlling the transmittance between bright display and dark display.

Therefore, it is preferable that the peak wavelength of the transmission light spectral characteristic when the liquid crystal layer performs the bright display operation or the peak wavelength of the transmission light spectral characteristic when the liquid crystal layer performs the half-tone display operation with transmittance close to the bright display operation correspond to the fourth peak wavelength.

In this way, the peak wavelength of the transmission light spectral characteristic of the liquid crystal layer does not only correspond to the fourth peak wavelength, but the color development of the fourth colored layer is also improved in the bright display operation or the half-tone display operation close to the bright display operation. Thus, it is possible to emit clearly colored light.

Further, in the liquid crystal display device according to the present invention, one of the first and second colored layers is colored blue, and the other colored layer is colored green. In addition, the third colored layer is colored red, and the fourth colored layer is colored cyan.

According to this structure, since the peak wavelength of the C colored layer corresponds to the peak wavelength of the transmission light spectral characteristic of the liquid crystal layer, it is possible to improve the color development of C whose display color has been dark in the conventional liquid crystal display device due to a poor color development, thereby emitting clearly colored light from the C colored layer. Further, since the color filter portion is composed of four colored layers constructed by adding the C colored layer to the R, G, and B colored layers, it is possible to realize a very wide color reproduction range and to display an image with a display color that is within a wider wavelength band and closer to natural light, thereby displaying a high-quality image.

In the xy chromaticity characteristic, since a region positioned at the left side or upper left side of a line linking B and G coordinates has an area larger than that of a region positioned at the upper right side of a line linking G and R coordinates or a region positioned at the lower right side of a line linking R and B coordinates, the region has a possibility of realizing a color closer to natural light. Therefore, it is possible to extend the color reproduction range of the region having the possibility by providing a color corresponding to the color coordinates in the region positioned at the left side or upper left side of the line linking the B and G coordinates to the unit pixel, that is, by providing the C dot to the unit pixel. Thus, it is possible to realize a display color having a wide wavelength band and closer to natural light.

Further, the liquid crystal display device in which a unit pixel is provided with the R, G, B, and C colored layers can have a displayable region in the xy chromaticity characteristic greater than that of a liquid crystal display device in which the pixel unit is provided with other colored layers, such as a Y colored layer and the like.

Furthermore, in the liquid crystal display device according to the present invention, one of the first and second colored layers is colored green, and the other colored layer is colored red. In addition, the third colored layer is colored blue, and the fourth colored layer is colored yellow.

According to this structure, since the peak wavelength of the Y colored layer corresponds to the peak wavelength of the transmission light spectral characteristic of the liquid crystal layer, it is possible to improve the color development of Y whose display color has been dark in the conventional liquid crystal display device due to a poor color development, thereby emitting clearly colored light from the Y colored layer. Further, since the color filter portion is composed of four colored layers constructed by adding the Y colored layer to the R, G, and B colored layers, it is possible to realize a very wide color reproduction range and to display an image with a display color that is within a wider wavelength band and closer to natural light, thereby displaying a high-quality image.

Moreover, the liquid crystal display device according to the present invention further comprises an illuminating unit for emitting light to the colored layers, and the illuminating unit includes a peak wavelength corresponding to the fourth peak wavelength in the spectral characteristic.

Here, a backlight, such as a white LED or a fluorescent tube, is used as the illuminating unit for emitting light to the colored layers.

According to this structure, it is possible to improve the color development of the fourth colored layer by making the peak wavelength of the liquid crystal layer correspond to the fourth peak wavelength. In addition, since a peak wavelength corresponding to the fourth peak wavelength is included in illumination light, it is also possible to further accentuate the fourth peak wavelength, thereby emitting more clearly colored light from the fourth colored layer. Thus, it is possible to realize a very wide color reproduction range and to display an image with a display color that is within a wider wavelength band and closer to natural light, thereby displaying a high-quality image.

Further, the liquid crystal display device according to present invention further comprises a reflective portion for reflecting external light to the colored layers.

Here, the reflective portion reflects light incident from the outside of the liquid crystal display device from the inside of the liquid crystal display device, so that the reflected light is incident on the colored layers. For example, a metal film having high reflectance is used as the reflective portion. The reflective portion reflects external light to the colored layers, and then the colored layers transmit the reflected light with the wavelength selection characteristics of the first to fourth peak wavelength included in the external light. Then, the liquid crystal layer controls the amount of transmission light. Thus, it is possible to realize a very wide color reproduction range and to display a display color that is within a wider wavelength band and closer to natural light, using the reflected light.

Furthermore, an electronic apparatus of the present invention has the above-mentioned liquid crystal display device.

The electronic apparatus includes, for example, mobile phones, personal digital assistants, watches, word processors, information processing apparatuses, such as personal computers, televisions having a large display screen, large monitors, etc. Further, it is possible to realize a very wide color reproduction range and to display an image with a display color that is within a wider wavelength band and closer to natural light, and it is also possible to improve the color development of the fourth peak wavelength, by applying the liquid crystal display device of the present invention to a display unit of an electronic apparatus. Thus, it is possible to provide an electronic apparatus capable of displaying a high-quality image.

DETAILED DESCRIPTION OF EMBODIMENTS

Hereinafter, preferred embodiments of the present invention will be described with reference to the accompanying drawing.

In all the drawings, since each layer and each member are shown to have a recognizable size, the reduced scale of each layer and each member is different from the actual scale.

First Embodiment

Hereinafter, a first embodiment of the present invention will be described with reference to FIGS. 1 to 6.

In the present embodiment, an active matrix transmissive liquid crystal display device having thin film transistors (hereinafter, referred to as TFTs) as switching elements will be described as an example.

Figure 1:
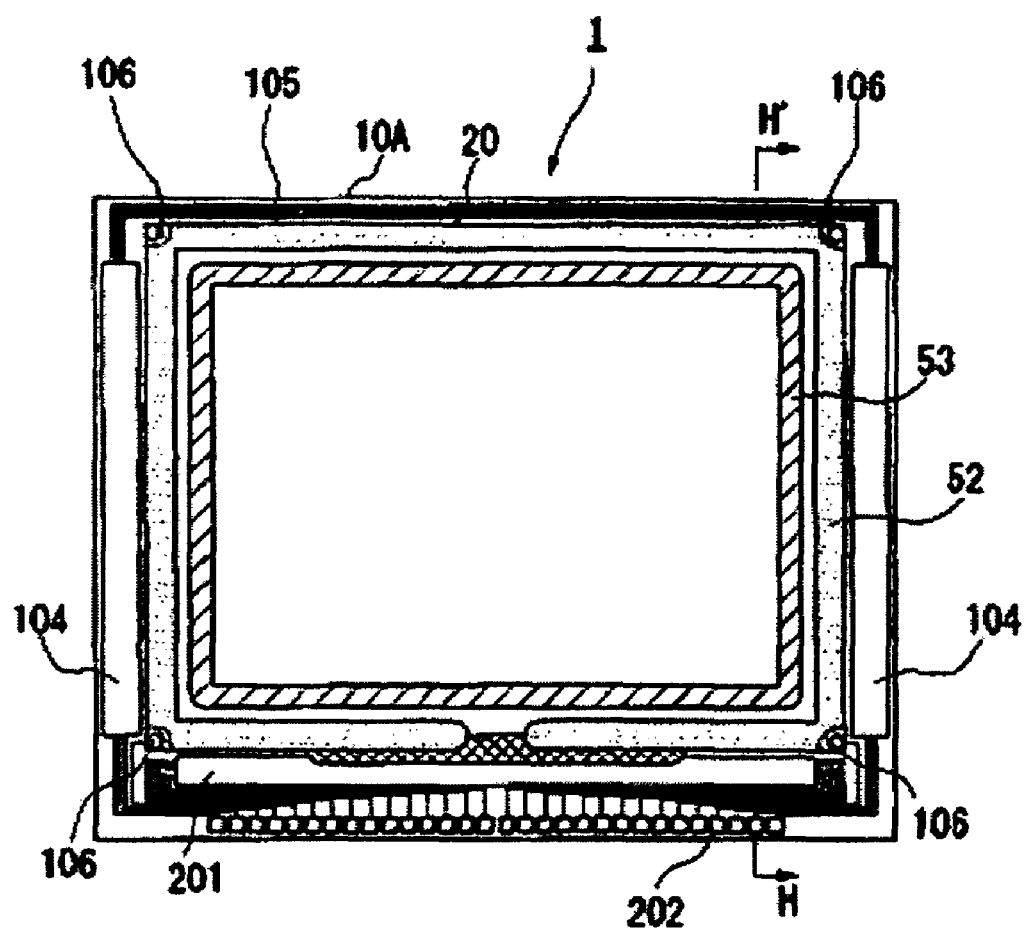
FIG. 1 is a plan view illustrating each component of a liquid crystal display device according to a first embodiment of the present invention.
Figure 2:
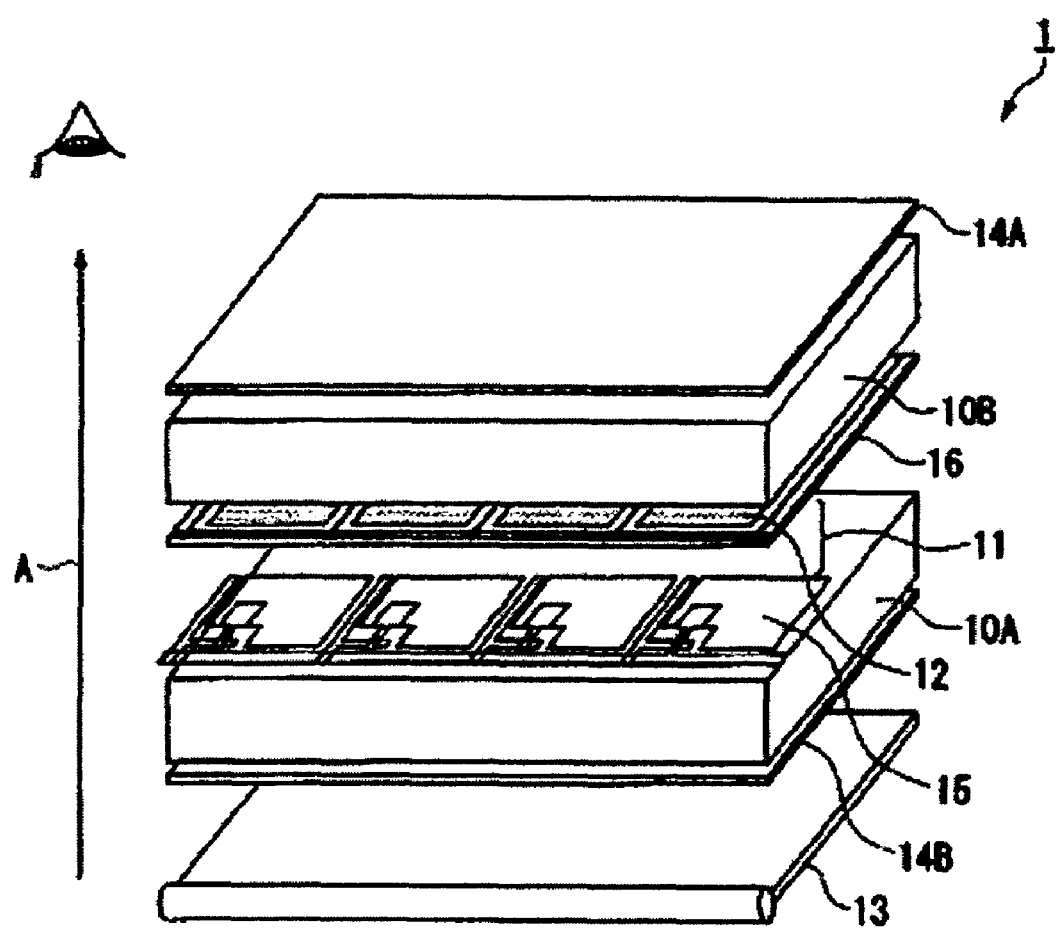
FIG. 2 is a perspective view illustrating the sectional structure of the liquid crystal display device according to the first embodiment of the present invention.
Figure 3:
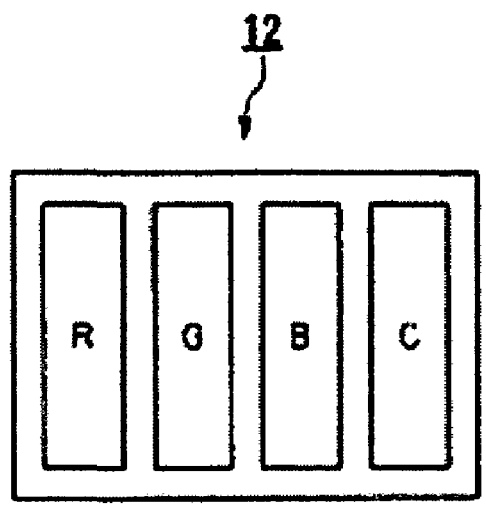
FIG. 3 is a plan view illustrating the arrangement of a color filter of the liquid crystal display device according to the first embodiment of the present invention.
Figure 4:
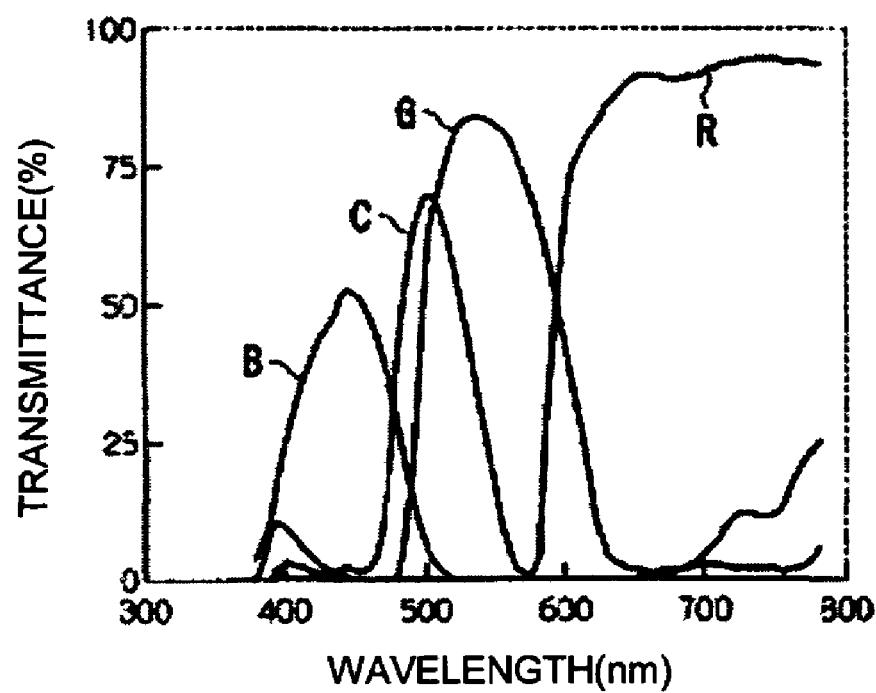
FIG. 4 is a view illustrating a wavelength selection characteristic of the color filter shown in FIG. 3.
Figure 5:
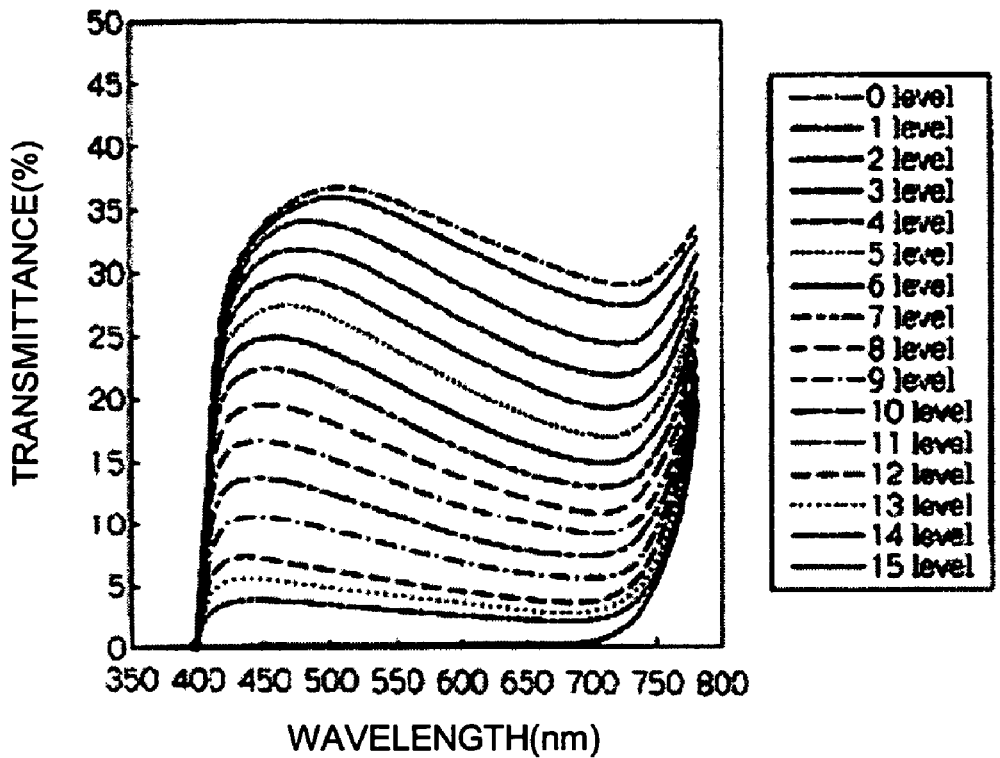
FIG. 5 is a view illustrating a spectral characteristic of transmission light of the liquid crystal display device according to the first embodiment of the present invention.
Figure 6:
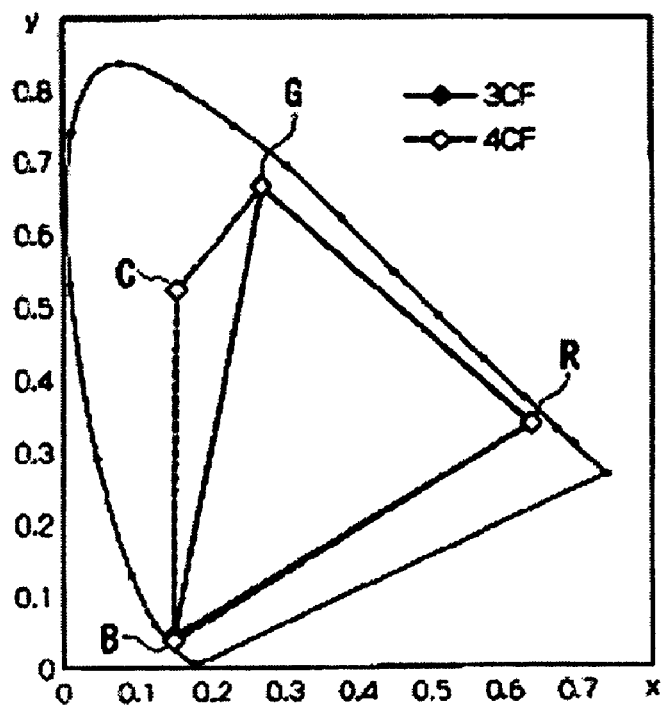
FIG. 6 is view illustrating an xy chromaticity characteristic of the liquid crystal display device according to the first embodiment of the present invention.

FIG. 1 is a plan view of components of a liquid crystal display device according to the present embodiment as seen from a counter substrate side, and FIG. 2 is a perspective view illustrating the sectional structure of the liquid crystal display device. FIG. 3 is a view illustrating the plane arrangement of a color filter of the liquid crystal display device, and FIG. 4 is a graph illustrating a wavelength selection characteristic of the color filter. FIG. 5 is a view illustrating a transmission light spectral characteristic of a liquid crystal layer, and FIG. 6 is a view illustrating an xy chromaticity characteristic of the color filter of the liquid crystal display device.

As shown in FIG. 1, in a liquid crystal display device 1 of the present embodiment, a TFT array substrate 10A and a counter substrate 10B are bonded to each other by a sealing material 52, and a liquid crystal layer 11 is sealed in a region partitioned by the sealing material 52. A light shielding film (frame) 53 made of a light shielding material is formed on the inside of the region in which the sealing material 52 is formed. A data line driving circuit 201 and external circuit mounting terminals 202 are formed along one side of the TFT array substrate 10A in a peripheral circuit region outside the sealing material 52, and scanning line driving circuits 104 are formed along two sides adjacent to the one side. A plurality of wiring lines 105 for connecting the scanning line driving circuits 104 provided at both sides of a display region are provided along the other side of the TFT array substrate 10A. In addition, conductive members 106 are provided at four corners of the counter substrate 10B for electrically connecting the TFT array substrate 10A to the counter substrate 10B.

As shown in FIG. 2, pixel electrodes 15 are formed on an inner surface of the TFT array substrate 10A, and a common electrode 16 is formed on an inner surface of the counter substrate 10B. Further, color filters 12 are formed between the counter substrate 10B and the common electrode 16.

Furthermore, a backlight unit 13 and upper and lower polarizing plates 14A and 14B are formed on the outer surfaces of the TFT array substrate 10A and the counter substrate 10B, respectively.

Moreover, in the present embodiment, the term 'inner surface' means a surface facing the liquid crystal layer 11, and the term 'outer surface' means a surface opposite to the liquid crystal layer 1.

Now, each component will be described.

The TFT array substrate 10A and the counter substrate 10B are composed of transparent substrates made of a transparent material, such as glass or plastic.

Further, the pixel electrodes 15 and the common electrode 16 are made of a transparent conductive material, such as ITO (Indium Tin Oxide). The pixel electrodes 15 are respectively connected to TFTs (Thin Film Transistors) provided on the TFT array substrate 10A, and a voltage is applied to the liquid crystal layer 11 between the common electrode 16 and the pixel electrodes 15 according to the switching driving of the TFTs.

The backlight unit 13 functions as an illuminating unit of the present invention and comprises a light source and a light guiding plate. In this structure, light emitted from the light source is incident on the light guiding plate and is uniformly diffused, and the diffused light is then emitted from the light guiding plate in the direction of arrow A. The light source is composed of a fluorescent layer, a white LED, or the like. The light guiding plate is made of a resin, such as acryl.

The liquid crystal display device 1 having the above-mentioned structure is a transmissive liquid crystal display device in which light emitted from the backlight unit 13 travels in the direction of arrow A and is then emitted from the counter substrate 10B. Therefore, the liquid crystal display device 1 performs display by using light emitted from the backlight unit 13 serving as a light source.

Next, the structure of the color filter 12 will be described.

FIG. 3 shows a color filter 12 having four dots in one pixel and specifically shows the structure of a pixel composed of four-color dots formed by adding R, G, and B dots to a C dot. In addition, in the plane arrangement of the color filter 12, the R, G, B, and C dots are sequentially arranged from the left side as shown in FIG. 3. The color filters 12 having such dot arrangement are arranged on the entire surface of the display region of the liquid crystal display device 1 shown in FIG. 1.

Further, the respective R, G, B, and C dots having the above-mentioned arrangement function to transmit predetermined wavelength bands, that is, light components having predetermined colors, included in the illumination light emitted from the backlight unit 13 toward the observer side, respectively. Therefore, the respective R, G, B, and C dots function as colored layers of the present invention. In addition, the R, G, B, and C dots correspond to a third colored layer, a first colored layer, a second colored layer, and a fourth colored layer of the present invention, respectively.

Furthermore, as shown in FIG. 4, in the wavelength selection characteristic of the color filter 12, peak wavelengths of the R, G, C, and B dots are respectively larger than 450 nm (a second peak wavelength), 505 nm (a fourth peak wavelength), 550 nm (a first peak wavelength), and 620 nm (a third peak wavelength). wavelength), and 620 nm (a third peak wavelength).

Next, the liquid crystal layer 11 and the upper and lower polarizing plates 14A and 14B will be described.

The liquid crystal layer 11 has liquid crystal molecules whose alignment states are changed according to the value of a voltage applied by the common electrode 16 and the pixel electrodes 15. In the present embodiment, a TN mode in which the liquid crystal molecules are twisted by 90 degrees between the TFT array substrate 10A and the counter substrate 10B is adopted as a liquid crystal mode. In addition, the upper and lower polarizing plates 14A and 14B are arranged such that transmission axes thereof are orthogonal to each other.

In the liquid crystal layer 11 and the upper and lower polarizing plates 14A and 14B having the above-mentioned structures, the alignment of the liquid crystal molecules is changed according to the voltage value applied to the liquid crystal layer 11, which causes the amount of light passing through the liquid crystal layer 11 and the upper and lower polarizing plates 14A and 14B to be changed. Therefore, the liquid crystal layer 11 controls the amount of light (illumination light) emitted from the backlight unit 13 to transmit a predetermined amount of light toward the observer side.

Now, the transmission light spectral characteristic of the liquid crystal layer 11 will be described with reference to FIG. 5.

In the transmission light spectral characteristic shown in FIG. 5, a horizontal axis indicates a wavelength, and a vertical axis indicates the transmittance of transmission light. In FIG. 5, zero to fifteenth levels, serving as parameters, are obtained by dividing a half tone (a half-tone display operation) between the bright display (a bright display operation) and the dark display (a dark display operation) of the liquid crystal layer 11 into 16 stages. That is, the zero level indicates a transmission light spectral characteristic (the bright display operation) where the illumination light emitted from the backlight unit 13 passes at the highest brightness. In addition, the first to fourteenth levels indicate the spectral characteristics of the transmission light (the half-tone display operation) in a case in which the transmittance of the illumination light from the backlight unit 13 is lower than the zero level. Further, the fifteenth level indicates a state (the dark display operation) in which the illumination light from the backlight unit 13 is shielded. The adjustment of the bright display, dark display, and half-tone display is controlled by the voltage value applied between the common electrode 16 and the pixel electrodes 15.

Further, the transmission light spectral characteristic shown in FIG. 5 represents a spectral characteristic of the transmission light passing through the liquid crystal layer 11 and the upper and lower polarizing plates 14A and 14B. Therefore, the wavelength distribution shown in FIG. 5 includes the wavelength selection characteristics of the upper and lower polarizing plates 14A and 14B. Thus, the wavelength distribution shown in FIG. 5 is not determined by only the liquid crystal layer 11, but is determined by all the wavelength selection characteristics of the upper and lower polarizing plates 14A and 14B and the liquid crystal layer 11.

In the present embodiment, a peak value of the transmission light spectral characteristic shown in FIG. 5 is determined so as to be equal to a peak value of the wavelength selection characteristic of the C dot in the color filter 12. That is, as shown in FIG. 4, since a peak wavelength of the C dot is 505 nm, the peak value of the transmission light spectral characteristic of the liquid crystal layer 11 is set to be approximate to 505 nm.

More specifically, the peak value of the transmission light spectral characteristic is approximately set to 505 nm by adjusting the total retardation of the liquid crystal cell including the retardation of the liquid crystal layer 11 and a phase difference according to the positions of the polarizing plates 14A and 14B or a retardation plate (not shown).

Furthermore, in the present embodiment, the peak wavelength of the C dot correspond to the peak value of the transmission light spectral characteristic of the liquid crystal layer 11, but the present invention is not limited thereto. That is, the peak value of the C dot does not completely correspond to the peak value of the transmission light spectral characteristic of the liquid crystal layer 11, but it is preferable that both values approximately correspond to each other in the optical design of the liquid crystal display device. That is, the peak wavelength of the C dot is positioned between the peak wavelength of the B dot and the peak wavelength of the G dot. However, it is preferable that the peak value of the transmission light spectral characteristic of the liquid crystal layer 11 be set so as not to correspond to the peak wavelengths of the B and C dots.

Thus, the peak value of the transmission light spectral characteristic of the liquid crystal layer 11 is set so as to correspond to the peak wavelength of the C dot.

Moreover, in the transmission light spectral characteristic, the spectral characteristic of a level where the half tone close to the bright display (zero level) is performed rather than a level (the vicinity of the tenth to fourteenth levels) where the half tone close to the dark display (fifteenth level) is performed is set to be approximate to 505 nm. As such, the peak wavelength of the C dot corresponds to the spectral characteristic of display close to the bright display, which makes it possible to emit light having a more clear color from the C dot in the half tone close to the bright display or dark display.

Next, the difference of an xy chromaticity characteristic between the liquid crystal display device 1 having a pixel structure composed of four-color dots (4CF) and a liquid crystal display device having a pixel structure composed of three-color dots (3CF) will be described with reference to FIG. 6. The pixel structure composed of three-color dots can realize colors of a triangular region in the xy chromaticity characteristic, but the pixel structure composed of four-color dots can realize colors of a rectangular region in the xy chromaticity characteristic. Thus, the liquid crystal display device 1 of the present embodiment having the pixel structure composed of four-color dots can realize a wide color gamut. In addition, the liquid crystal display device 1 can achieve 100% of NTSC ratio.

As described above, in the present embodiment, the peak wavelength of the transmission light spectral characteristic of the liquid crystal layer 11 corresponds to the peak wavelength of the C dot. Therefore, transmission light having a wavelength corresponding to the peak wavelength of the C dot, that is, a wavelength in the vicinity of 505 nm illuminates the C dot without being attenuated in the liquid crystal layer 11. Thus, it is possible to improve the color development of the C dot and thus to emit clearly colored light from the C dot.

Further, since a color filter portion includes the respective R, G, and B color dots and the C dot, it is possible to realize a very wide color reproduction range and to display an image with a display color that is within a wider wavelength band and closer to natural light. In addition, since clearly colored light is emitted from the C dot, it is possible to display a high-quality image.

Furthermore, in the above-mentioned Patent Document, the display color of the C dot is dark, so that clearly colored light is not obtained. The reason is that, because the peak wavelength of the transmission light spectral characteristic of the liquid crystal layer 11 does not correspond to the peak wavelength of the wavelength selection characteristic of the C dot, the transmission light corresponding to the peak wavelength of the C dot is attenuated when the illumination light from the backlight unit 13 passes through the liquid crystal layer 11, which results in a poor color development of the C dot. On the contrary, in the present embodiment, it is possible to improve the color development of the C dot and thus to emit clearly colored light from the C dot, thereby solving the problems of the above-mentioned Patent Document.

Moreover, in the present embodiment, the structure where a unit pixel is provided with four-color dots composed of the R, G, and B dots and the C dot is used.

In the xy chromaticity characteristic, since a region positioned at the left side or upper left side of a line linking B and G coordinates has an area larger than that of a region positioned at the upper right side of a line linking G and R coordinates or a region positioned at the lower right side of a line linking R and B coordinates, the region has a possibility of realizing a color closer to natural color. Therefore, it is possible to extend the color reproduction range of the region having the possibility by providing a color corresponding to the color coordinates in the region positioned at the left side or upper left side of the line linking the B and G coordinates to the unit pixel, that is, by providing the C dot to the unit pixel. Thus, it is possible to realize a display color having a wide wavelength band and closer to natural light.

Further, the liquid crystal display device in which a unit pixel is provided with the R, G, B, and C colored layers can have a displayable region in the xy chromaticity characteristic greater than that of a liquid crystal display device in which the pixel unit is provided with other colored layers, such as a Y colored layer and the like.

Second Embodiment

Next, a second embodiment of the present invention will be described with reference to FIG. 7.

In the present embodiment, the same components as those in the first embodiment have the same reference numerals, and a description thereof will be omitted. Thus, different parts from the first embodiment will be described.

The present embodiment is similar to the first embodiment in that the peak value of the wavelength selection characteristic of the C dot corresponds to the peak value of the transmission light spectral characteristic of the liquid crystal layer 11 and in that the spectral characteristic of illumination light from the backlight unit 13 includes the peak wavelength of the C dot.

Figure 7:
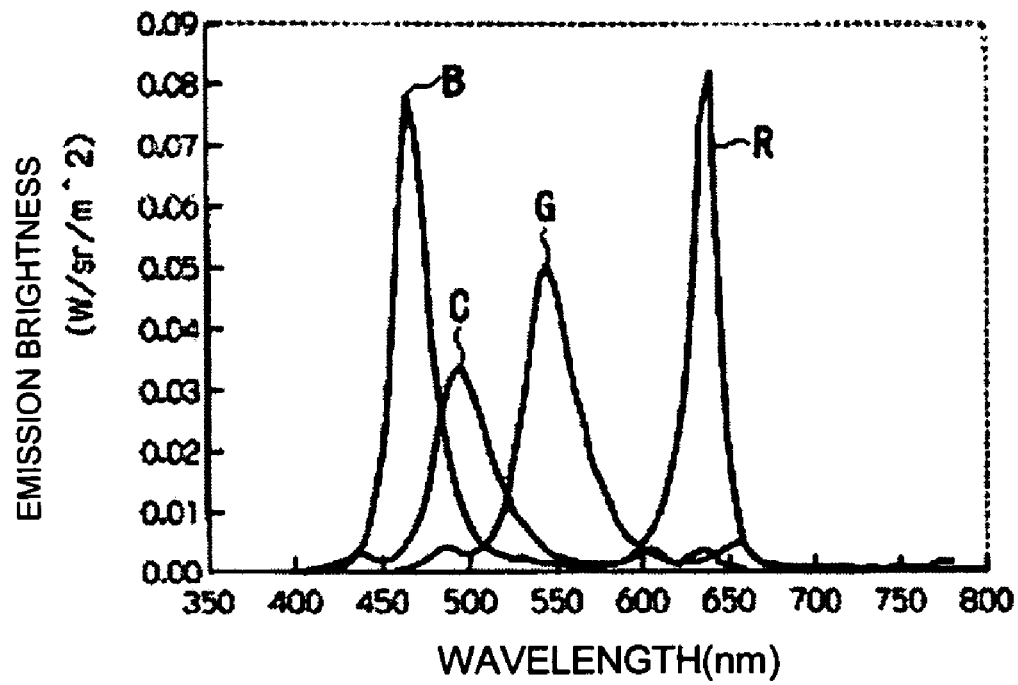
FIG. 7 is a view illustrating a spectral characteristic of a liquid crystal display device according to a second embodiment of the present invention.

FIG. 7 is a graph illustrating the spectral characteristic of illumination light emitted from the backlight unit 13.

The backlight unit 13 of the present embodiment is composed of a white backlight using four LEDs having different emission colors. The four light components emitted from the LEDs have peak wavelengths of 470 nm (B), 500 nm (C), 550 nm (G), and 645 nm (R), respectively. The peak wavelengths of the emission light components are substantially equal to those in the wavelength selection characteristic of the color filter 12 shown in FIG. 4. Particularly, by making a peak wavelength (500 nm) of light emitted from the backlight unit 13 through the C dot correspond to the peak wavelength of the wavelength selection characteristic of the C dot, it is possible to realize a liquid crystal display device having a wider color range, and it is also possible to realize 122% of NTSC ratio.

As described above, the peak value of the wavelength selection characteristic of the C dot corresponds to the peak value of the transmission light spectral characteristic of the liquid crystal layer 11, and the illumination light from the backlight unit 13 includes the peak wavelength corresponding to the peak wavelength of the C dot in the spectral characteristic. Therefore, it is possible to accentuate the peak wavelength of light emitted from the C dot, and thus it is possible to emit clearly colored light from the C dot. Thus, it is possible to realize a very wide color reproduction range and to display an image with a display color that is within a wider wavelength band and closer to natural light, thereby displaying a high-quality image.

Further, in the present embodiment, the backlight unit 13 is composed of the LEDs emitting light components having wavelengths corresponding to R, Q B, and C. However, since it is preferable that the peak of the spectral characteristic of the backlight unit 13 exist in the vicinity of the peak wavelength of the wavelength selection characteristic of the C dot, the backlight unit may be composed of a combination of a white LED and a cyan LED, a combination of a white cold-cathode tube and the cyan LED, or the like.

Third Embodiment

Next, a third embodiment of the present invention will be described below.

In the third embodiment, the same components as those in the first and second embodiments have the same reference numerals, and a description thereof will be omitted.

In the first and second embodiments, the transmissive liquid crystal display device has been described as an example. However, the present embodiment describes a reflective liquid crystal display device in which the peak value of the wavelength selection characteristic of the C dot corresponds to the peak value of the transmission light spectral characteristic of the liquid crystal layer 11.

In this case, the liquid crystal display device 1 has a reflective portion for reflecting external light to the respective R, G, B, and C dots. As for the reflective portions, a substrate having a metal film or a reflective metal film thereon is used instead of the backlight unit 13.

In the reflective liquid crystal display device, the reflective portion reflects external light to the respective R, G, B, and C dots, and then the reflected light passes through the R, G, B, and C dots to have the wavelength selection characteristics thereof. In addition, the liquid crystal layer 11 controls the transmission amount of the reflected light. Therefore, the peak value of the wavelength selection characteristic of the C dot corresponds to the peal value of the transmission light spectral characteristic of the liquid crystal 11.

As described above, in the present embodiment, it is possible to realize a very wide color reproduction range and to display a display color that is within a wider wavelength band and closer to natural light, using the reflected light. In addition, since clearly colored light is emitted from the C dot, it is possible to display a high-quality image.

The reflective liquid crystal display device has been described above, but the present invention can be applied to a transflective liquid crystal display device having a reflective portion. The transflective liquid crystal display device is provided with the backlight unit 13 and the reflective portion provided at the outside of the backlight unit 13.

Further, as another embodiment of the transflective liquid crystal display device, a multi-gap structure in which both a transmissive display region and a reflective display region are provided in the respective R, G, B, and C dots can be used. In such a multi-gap structure, a reflective portion composed of a scattering resin film or a reflective metal film is provided in only the reflective display region. In addition, in the transflective display region, display is performed using the illumination light emitted from the backlight unit 13.

In the transflective liquid crystal display device, the respective R, G, B, and C dots are illuminated by light reflected from the reflective portion or by illumination light emitted from the backlight unit 13, and then the reflected light or the illumination light passes through the respective R, G, B, and C dots to have the wavelength selection characteristics thereof. In addition, the liquid crystal layer 11 controls the transmission amount of the reflected light or the illumination light.

As described above, in the present embodiment, it is possible to realize a very wide color reproduction range and to display a display color that is within a wider wavelength band and closer to natural light, using the reflected light. In addition, since clearly colored light is emitted from the C dot, it is possible to display a high-quality image.

Fourth Embodiment

Next, a fourth embodiment of the present invention will be described below.

In the present embodiment, the same components as those in the first to third embodiments have the same reference numerals, and a description thereof will be omitted.

In the first to third embodiments, the color filter 12 having the arrangement of four-color dots constructed by adding the C dot to the R, G, and B dots has been described as an example. However, the prevent embodiment describes a structure in which a Y dot is used instead of the C dot.

That is, the color filter 12 has the R, B, and B dots and an additional Y dot in a unit pixel. In addition, the R, G, B, and Y dots correspond to the second colored layer, the first colored layer, the third colored layer, and the fourth colored layer in the present invention, respectively.

Therefore, the peak value of the wavelength selection characteristic of the Y dot corresponds to the peak value of the transmission light spectral characteristic of the liquid crystal layer 11.

In this way, it is possible to improve the color development of the Y dot whose display color has been dark due to a poor color development, thereby emitting clearly colored light. Further, since the color filter portion is composed of four colored layers constructed by adding the Y colored layer to the R, G, and B colored layers, it is possible to realize a very wide color reproduction range and to display an image with a display color that is within a wider wavelength band and closer to natural light, thereby displaying a high-quality image.

In the first to third embodiments, the liquid crystal display device 1 having the four-color dots has been described. However, five-color dots or six-color dots constructed by adding one or two dots having different wavelength bands to the four-color dots can be used. In this case, the same effects as described above can be obtained by making the peak value of the wavelength selection characteristic of the C or Y dot among the five-color dots or six-color dots including the R, G, and B dots correspond to the peak value of the transmission light spectral characteristic of the liquid crystal layer 11.

Electronic Apparatus

Figure 8:
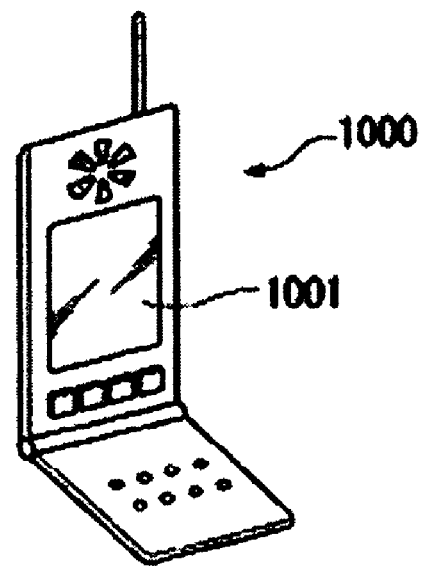
FIG. 8 is a view illustrating an electronic apparatus having the liquid crystal display device of the present invention.

FIG. 8 shows an embodiment of an electronic apparatus according the present invention.

The electronic apparatus of the present embodiment has the above-mentioned liquid crystal display device or an organic EL device as a display unit.

FIG. 8 is a perspective view illustrating an example of a mobile phone. In FIG. 8, reference numeral 1000 indicates a main body of the mobile phone, and reference numeral 1001 indicates a display unit using the liquid crystal display device. The electronic apparatus shown in FIG. 8 has the liquid crystal display device of the present invention as the display unit. Therefore, it is possible to realize a very wide color reproduction range and to display an image with a display color that is within a wider wavelength band and closer to natural light. In addition, since the peak wavelength of the C or Y dot can increase, it is possible to provide an electronic apparatus capable of displaying a high-quality image.

The preferred embodiments of the present invention have been described above with reference to the accompanying drawings, but the present invention is not limited thereto. Further, the shapes or combinations of the respective components described in the embodiments are just illustrative examples, and various modifications and changes can be made without departing from the scope and spirit of the present invention.

What is claimed is:

1. A liquid crystal display device comprising:
   color filter portions each having a plurality of colored layers in a unit pixel;
   a liquid crystal layer for controlling the amount of light passing through the color filter portions; and
   an illuminating unit for emitting light through the colored layers and the liquid crystal layer,
   wherein the color filter portion has, in the unit pixel, blue, green, and red colored layers respectively having blue, green, and red transmittance peak wavelengths at blue, green, and red regions respectively, and a cyan colored layer having a cyan transmittance peak wavelength between the blue transmittance peak wavelength and the green transmittance peak wavelength, the cyan transmittance peak wavelength having a peak transmittance (%) that is greater than a peak transmittance (%) of the blue transmittance peak wavelength, and
   the illuminating unit has a cyan emission brightness peak wavelength corresponding to the cyan transmittance peak wavelength in the spectral characteristic of the cyan colored layer, and an emission brightness at a blue emission brightness peak wavelength that is greater than an emission brightness at the cyan emission brightness peak wavelength.

2. The liquid crystal display device according to claim 1, further comprising a reflective portion for reflecting external light to the colored layers.

3. An electronic apparatus having the liquid crystal display device according to claim 1.

4. The liquid crystal display device according to claim 1, wherein
   an order of transmittance peak wavelengths of the colored layers, from smallest to largest, is blue, cyan, green and red, and
   an order of emission brightness peak wavelengths of the illuminating unit, from smallest to largest, is cyan, green, blue and red.

5. The liquid crystal device according to claim 1, wherein the emission brightness at the blue emission brightness peak wavelength is more than twice the emission brightness at the cyan emission brightness peak wavelength.

* * * * *